UNITED STATES PATENT OFFICE.

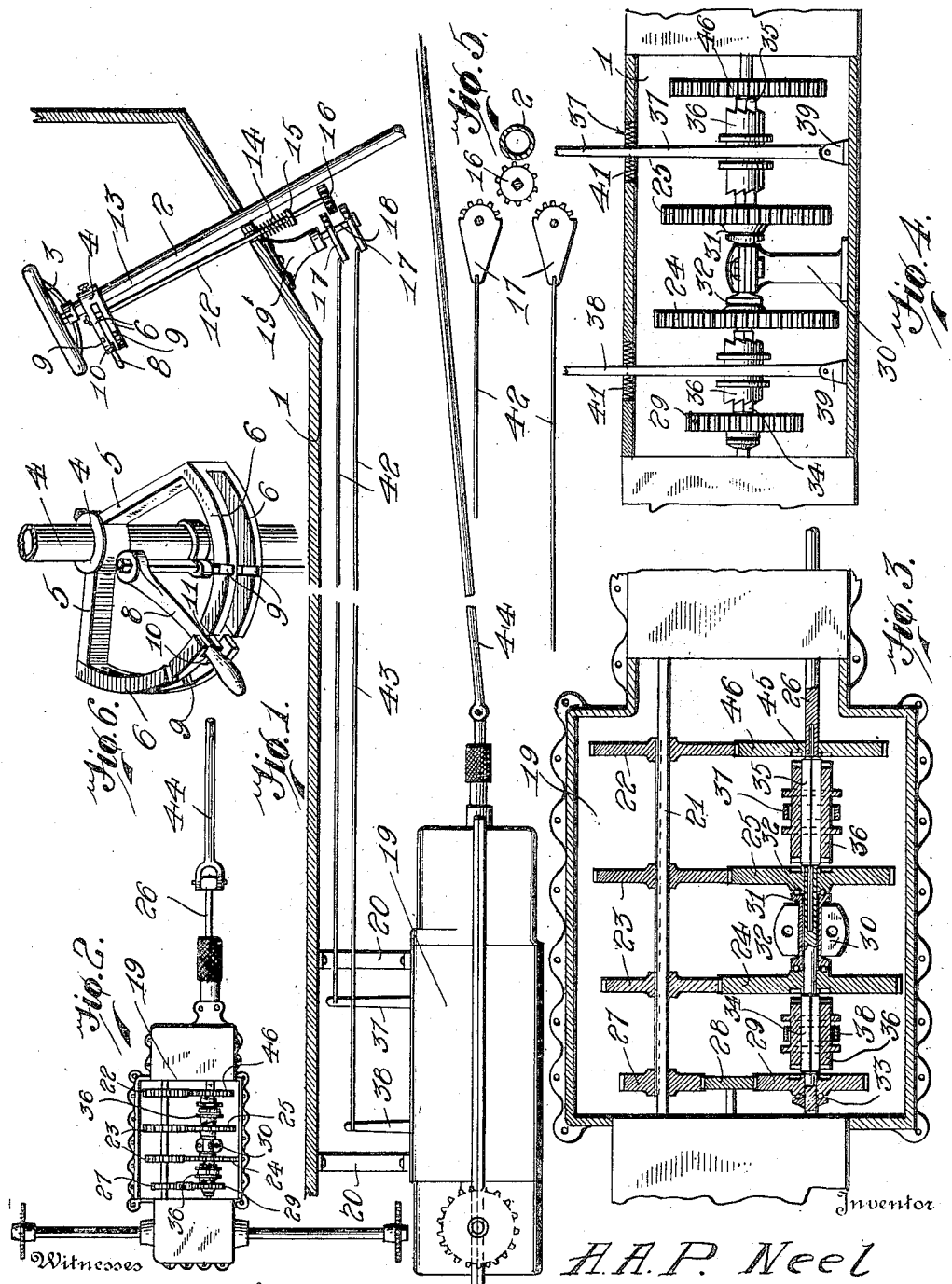

ALLEN A. P. NEEL, OF MARSHALL, VIRGINIA, ASSIGNOR OF ONE-HALF TO THOMAS HENDERSON MADDUX, OF MARSHALL, VIRGINIA.

AUTOMOBILE TRANSMISSION MECHANISM.

1,123,915.

Specification of Letters Patent.

Patented Jan. 5, 1915.

Application filed May 16, 1914. Serial No. 839,039.

*To all whom it may concern:*

Be it known that I, ALLEN A. P. NEEL, a citizen of the United States, residing at Marshall, in the county of Fauquier and State of Virginia, have invented certain new and useful Improvements in Automobile Transmission Mechanism, of which the following is a specification, reference being had therein to the accompanying drawing.

This invention relates to speed changing devices and has for its object the production of an efficient means for changing the speed of the driving mechanism of a vehicle such as an automobile or the like.

The principal objects of the invention are the production of a simple and efficient mechanism for the variation of speed without the usual shifting of gears, and for controlling the change of speed from the steering wheel of the vehicle.

Other objects and advantages of the present invention will appear throughout the following specification and claims.

In the accompanying drawings:—Figure 1 is a side elevation of the speed changing mechanism and the transmission casing, a portion of the body of the vehicle being shown in section. Fig. 2 is a top plan view of the transmission casing showing the cover plate removed therefrom. Fig. 3 is an enlarged view of the transmission casing in top plan, the gears being shown in section. Fig. 4 is a central longitudinal section through the transmission casing showing the driving gears in elevation. Fig. 5 is a diagrammatic view showing the construction of the several gears which are adapted to coöperate for throwing the speed changing levers. Fig. 6 is a detail perspective view of the quadrant adapted to be secured to the steering wheel.

By referring to the drawings it will be seen that 1 designates the body of the vehicle through which extends the usual steering shaft 2 which carries the steering wheel 3. A quadrant frame 4 is secured to the steering shaft 2, and this quadrant frame comprises a plurality of radiating arms 5, which arms support the substantially parallel spaced arms 6 arranged on the arc of a circle as clearly illustrated in Fig. 6. The upper arms 6 are provided with notches 7 formed upon the upper face thereof at a desired distance from the center of the quadrant for the purpose of receiving the operating handle 8 as will be clearly hereinafter described. The lower arms 6 are also provided with notches 9 upon their upper face for also receiving the operating handle 8 when the same is in engagement with the lower arms 6. One of the upper arms 6 is provided with the pocket portion 10 adjacent the centrally located notch 11 as illustrated in Fig. 6 for the purpose of allowing the handle 8 to be placed therein and be held in a neutral position as will be more clearly hereinafter described.

An operating shaft 12 is supported upon a bracket 13 as is clearly illustrated in Fig. 1, and this shaft 12 carries a spring 14 which bears against the collar 15 carried near the lower end thereof for normally urging a downward pressure upon the shaft 12. A gear 16 is carried by the lower end of the shaft 12 as illustrated in Fig. 1, and this gear is adapted to be thrown into engagement with the gear fingers 17 supported upon a depending shaft 18 carried by a hanger bracket 19'.

A transmission casing 19 is suspended below the face of the vehicle 1 upon brackets 20 as is illustrated in Fig. 1, and this transmission casing 19 carries the usual counter-shaft 21 upon which is mounted the direct driving gear 22 and a plurality of gears 23 of different size for meshing with the varying speed gears 24 and 25 carried by the main driving shaft 26. A reverse gear 27 is also carried by the counter-shaft 21 and engages an intermediate pinion 28, which pinion engages the reverse driving gear 29, which driving gear 29 is loosely mounted upon the main driving shaft 26.

The main driving shaft 26 is supported upon a standard 30, and this shaft 26 is formed in a plurality of sections as illustrated in Fig. 3 for the purpose of facilitating the placing of the gears 24, 25 and 29 thereon. A sleeve 31 is carried by the standard 30, and this sleeve is provided with bearings 32 at its respective ends for the purpose of relieving the respective gears 24 and 25. A bearing 33 is also employed at the rear end of the main driving shaft 26 for the purpose of constituting a support or bearing for the reverse driving gear 29.

The shaft 26 is provided with a plurality of square portions 34 and 35 upon which are slidably mounted the clutches 36. The forward clutch 36 is engaged by means of the forward clutch operating lever 37, whereas the rear clutch member 36 is engaged by means of the rear clutch operating lever 38. The clutch operating levers 37 and 38 are pivotally supported upon the bottom of the transmission casing 19 by means of the pivotal supports 39 as is illustrated in Fig. 4.

The transmission casing 1 is provided with a plurality of elongated slots 40, and within these slots are placed springs 41 upon opposite sides of the levers 37 and 38 to normally hold the levers in a neutral position. It should be understood, however, that these springs may be placed in any desired position for the purpose of obtaining the desired result.

The forward clutch operating lever 37 is connected to the upper gear finger 17 by means of the longitudinally extending rod 42, whereas the rear clutch operating lever 38 is connected to the lower gear finger 17 by means of the connecting rod 43. It should be understood that the main driving shaft 26 is connected to the driving engine by means of the usual driving rod and connection 44 illustrated clearly in Figs. 1 and 2.

From the foregoing description it will be seen that the operation of the device is as follows:—The clutches 36 will be normally in a neutral position as is illustrated in Fig. 4 when the handle 8 is in the position shown in Fig. 6 or within the notch 10 of the quadrant 4. When, however, the handle 8 is swung out of the notch 10 and lifted so as to travel upon the upper arm 6 of the quadrant 4 and engage the notch 9 at the right of the notch 11, the shaft 12 will be rotated after first having been lifted to bring the gear 16 into engagement with the upper gear finger 17. When the shaft 12 is rotated toward the right, the connecting rod 42 will pull the clutch throwing lever 37 forwardly and throw the clutch 36 into engagement with the set-in clutch teeth 45 formed upon the direct driving gear 46 carried by the main driving shaft 26. If, however, the handle 8 is swung toward the left so as to engage the notch 9 to the left of the notch 11, the clutch 36 will be moved so as to engage the clutch teeth formed upon the second speed gear 25. If it is desired to cause the transmission to operate under the third speed gear 24, the handle 8 may be swung down through the notch 11 and swung toward the right to engage the right hand notch 9 in the lower arm 6, thereby causing the clutch 36 to engage the clutch teeth formed upon the face of the third speed drive gear 24. If, however, it is desired to cause the machine to travel in the reverse direction, the handle 8 is swung so as to engage the left hand lower notch 9, thereby throwing the clutch 36 into engagement with the reverse driving gear 29 as will be clearly seen by considering Fig. 3.

From the foregoing description it will be seen that a very simple and efficient device has been produced for controlling the variable change of speed within the transmission casing direct from the steering wheel of the vehicle, thereby eliminating the necessity of employing an ordinary operating lever which is now commonly used upon automobiles and devices of like nature. It should be understood that a great advantage has been obtained by applicant's device in eliminating this lever which is generally placed upon the side of the car or in the center thereof for the reason that by placing the operating mechanism under the steering wheel, the entire operating mechanism will be right at the hand of the operator and will also be out of the way to allow the operator to readily get into and out of the automobile. It should be further understood that by means of the present device it is not likely to cause a stripping of the teeth upon the respective drive gears as would be the case with the ordinary reciprocating tooth gear now commonly in use.

Having thus described the invention what is claimed as new, is:—

1. A device of the class described comprising a transmission mechanism, a speed changing device coöperating with said transmission mechanism, a quadrant adapted to be carried adjacent the steering wheel of a vehicle, an operating shaft coöperating with said quadrant for actuating said speed changing device, said quadrant provided with a plurality of spaced arms arranged upon an arc of a circle, one of said arms provided with a neutral notch, a handle connected to said shaft and adapted to normally fit within said neutral notch, one of said arms provided with spaced notches upon the upper face thereof, said handle adapted to be swung upon said arms for holding said shaft in a locked position, and means for normally urging a downward pressure upon said shaft for holding said handle within said notches.

2. A device of the class described comprising a transmission mechanism, a speed changing device coöperating with said transmission mechanism, a quadrant adapted to be carried adjacent the steering wheel of a vehicle, an operating shaft coöperating with said quadrant for actuating said speed changing device, said quadrant provided with a plurality of spaced arms arranged on an arc of a circle, one of said arms provided with a substantially L-shaped depending tongue constituting a neutral lever receiving pocket, a lever connected to said shaft and adapted to normally fit in said pocket, one of said arms provided with spaced notches upon the upper face thereof, said lever adapted to be swung upon said arms for holding said shaft in a locked position, and means for normally urging a downward pressure upon said shaft for holding said lever within said notches.

3. A device of the class described comprising a transmission mechanism, a speed changing device coöperating with said transmission mechanism, a quadrant adapted to be carried adjacent the steering wheel of a vehicle, an operating shaft coöperating with said quadrant for actuating said speed changing device, said quadrant provided with a plurality of spaced arms arranged upon an arc of a circle, one of said arms provided with a neutral notch, a handle connected to said shaft and adapted to normally fit within said neutral notch, both of said arms provided with notches formed upon the upper face thereof, said handle adapted to be swung upon said arms and engage one of said notches in one of said arms for holding said shaft in a locked position, and means for normally urging a downward pressure upon said shaft for holding said handle within said notches.

4. A transmission mechanism of the class described comprising a transmission casing, a main drive shaft, a countershaft, a plurality of varying speed gears carried thereby, a reverse gear carried by said casing, a plurality of varying speed drive gears loosely mounted upon said main drive shaft, a supporting standard engaging said main drive shaft placed intermediate the ends of said casing, bearings supported upon said standards and adapted to engage some of said varying speed drive gears, clutch members slidably mounted upon said main drive shaft and rotating therewith, pivotally mounted levers carried by the bottom of said casing and projecting through the top of said casing for facilitating the throwing of said clutch members into and out of engagement with said varying speed drive gears, and means for actuating said levers.

5. A transmission mechanism of the class described comprising a transmission casing, a main drive shaft, a countershaft, a plurality of varying speed gears carried thereby, a reverse gear carried by said casing, a plurality of varying speed drive gears loosely mounted upon said main drive shaft, a supporting standard engaging said main drive shaft placed intermediate the ends of said casing, bearings supported upon said standards and adapted to engage some of said varying speed drive gears, clutch members slidably mounted upon said main drive shaft and rotating therewith, pivotally mounted levers carried by the bottom of said casing and projecting through the top of said casing for facilitating the throwing of said clutch members into and out of engagement with said varying speed drive gears, said casing provided with apertures formed therein, said levers projecting through said apertures, equalizing springs mounted within said apertures and engaging said levers for normally holding the same in a neutral position, and means for facilitating the actuation of said levers.

6. A transmission mechanism of the class described comprising a transmission casing, a main drive shaft, a countershaft, a plurality of varying speed gears carried thereby, a reverse gear carried by said casing, a plurality of varying speed drive gears loosely mounted upon said main drive shaft, a supporting standard engaging said main drive shaft placed intermediate the ends of said casing, bearings supported upon said standards and adapted to engage some of said varying speed drive gears, clutch members slidably mounted upon said main drive shaft and rotating therewith, pivotally mounted levers carried by the bottom of said casing and projecting through said casing for facilitating the throwing of said clutch members into and out of engagement with said varying speed drive gears, said casing provided with apertures formed therein, said levers projecting through said apertures, equalizing springs mounted within said apertures and engaging said levers for normally holding the same in a neutral position, links connected to said levers, gear fingers connected to said links, an operating shaft, a gear carried by said operating shaft, said gear adapted to engage said gear fingers for operating said links and throwing said levers, and means for normally holding said gear out of engagement with either of said gear fingers, whereby said springs will be allowed to normally hold said levers in a neutral position.

In testimony whereof I hereunto affix my signature in presence of two witnesses.

ALLEN A. P. NEEL.

Witnesses:
T. H. MADDUX,
H. S. GROOM.